Dec. 28, 1965 MASAHARU MASUDA ETAL 3,226,277
MACHINE FOR CHEMICALLY POLISHING GLASS
Filed Oct. 23, 1962 2 Sheets-Sheet 1

INVENTORS
MASAHARU MASUDA
HIDEO KITA
RYUZO FUJITA
BY
McGlew & Toren
ATTORNEYS

Dec. 28, 1965  MASAHARU MASUDA ETAL  3,226,277
MACHINE FOR CHEMICALLY POLISHING GLASS
Filed Oct. 23, 1962  2 Sheets-Sheet 2

INVENTORS
MASAHARU MASUDA
HIDEO KITA
RYUZO FUJITA
BY
McGlew & Toren
ATTORNEYS 3,226,277
MACHINE FOR CHEMICALLY POLISHING
GLASS
Masaharu Masuda, Hideo Kita, and Ryuzo Fujita, all of Amagasaki, Japan, assignors to Nippon Sheet Glass Co. Ltd., Osaka, Japan, a corporation of Japan
Filed Oct. 23, 1962, Ser. No. 232,408
Claims priority, application Japan, Nov. 27, 1961, 36/59,068
4 Claims. (Cl. 156—345)

The present invention relates to an improved device for chemically polishing plate glass.

In polishing plate glass with the aid of a chemical polishing solution that is principally composed of hydrofluoric acid, fluorides, or bifluorides, when the foul solution, that is produced after the polishing solution has been applied to the surface of plate glass, remains on the glass surface already polished, the said polished surface is damaged, because the foul solution still has some chemical activity and corrodes the glass surface to some extent, and further prevents the fresh solution from acting on the glass surface. Besides, since the foul solution is more viscous than the original polishing solution the foul solution is removed unevenly from the glass surface by the polishing tool and so remains unevenly on the glass surface. Therefore the new or fresh solution acts unevenly on the glass and, as a result, defects, such as streaks, are produced on the polished glass surface.

The object of the present invention is to provide a device for polishing plate glass chemically with an improved efficiency obviating the above-mentioned disadvantage.

The polishing device of the present invention is designed for polishing plate glass chemically, using a polishing solution principally composed of hydrofluoric acid, fluorides, or bifluorides. The polishing tool, which is in working relation with a sheet of glass oriented horizontally, revolves around the axis of a vertical shaft. The polishing tool includes baffle plates extending radially and spirally from the revolving shaft and serving to sweep the foul solution to one side and off the glass sheet.

In order that the invention may be more clearly understood, embodiments thereof will now be described by way of example, with reference to the accompanying drawings in which, FIG. 1 is a plan view, partly in section, of one form of device embodying the invention;

Figure 1:
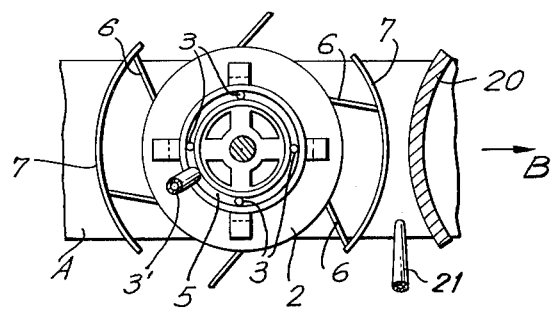
Figure 2:
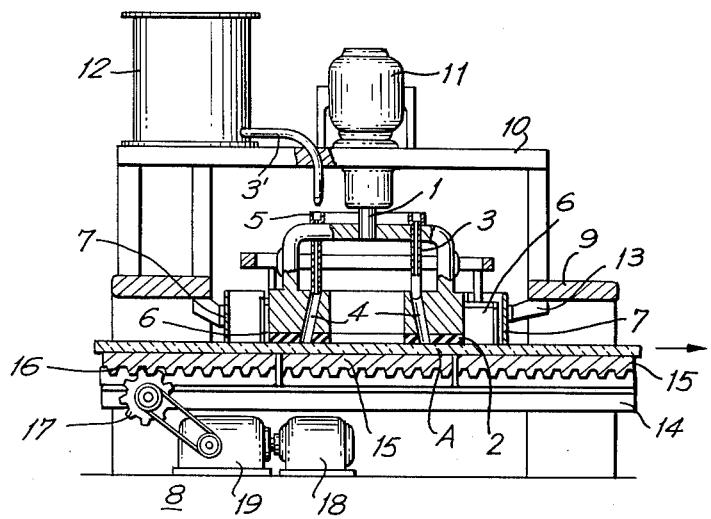
FIG. 2 is a side elevation view, partly in section, of the device shown in FIG. 1.

Referring first to the embodiment of FIGS. 1 and 2, a relatively massive annular disc or plate 2 is connected coaxially to a rotating shaft 1 through a spider or multi-armed support. Liquid supply pipes 3 extend through the arms of the spider support and parallel to the axis of shaft 1, and their lower ends are connected to bores or passages 4 drilled through disc 2. The upper ends of pipes 3 are connected to an annular trough or funnel 5 secured on the spider support coaxially with shaft 1. A plurality of baffle plates 6, of elastic material, are attached to extensions of the support spider to project from the periphery of disc 2 in such a manner that their lower edges slide on the upper surface of the glass sheet or plate A. Baffle plates 6 are so oriented that their radially outer edges slightly trail their inner edges in the direction of rotation of polishing disc 2. Arcuate stationary baffle plates 7, made from elastic material, are provided in engagement with the outer edges of the baffles 6 and have an axial length or height substantially equal to that of the polishing disc 2.

In the embodiment illustrated in FIGS. 1 and 2, the shaft 1 is rotatably supported by a frame 10. The frame 10 is provided on the upper part of another frame 9 which is installed on the floor 8 in such a manner as to be astride the locus of moving plate glass A. The shaft 1 is coupled with the driving shaft of motor 11 which is fixed on the frame 10. The transport pipe 3', for the polishing solution, is supported on the frame 10, and its upper end is connected to a polishing-solution tank 12 mounted on the frame 10. The stationary baffle plates 7 are fixedly connected to the frame 9 by means of holding members 13. Inside the legs of frame 9 are guide rails 14, along which a plurality of beds 15 of a given length are slidable. The lower surfaces of beds 15 are equipped with longitudinally extending racks 16, each rack extending along an imaginary line parallel with the rails 14. One of the racks 16 is engaged with a pinion gear 17, the axle of which is supported by the frame 9. The pinion gear 17 is connected through a reduction gear 19 to a motor 18 which is fixed on the floor 8. The plate glass A is carried, in one direction, by the plurality of beds 15 as the pinion gear 17 drives the beds 15 along the rails 14. The beds have an interspacing such that the pinion gear may engage one rack after another smoothly.

The revolving shaft 1 is kept nearly normal to the surface of plate glass A which is moving as described above.

The revolving shaft 1 rotates both the polishing disk 2 and the baffle plates 6 against the surface of plate glass, while the polishing solution that flows out of the supply pipes 3, being supplied from the tank 12 through the transport pipe 3' and the annular funnel 5, flows between the disk 2 and the surface of plate glass, which latter is thereby polished. The foul solution flows out from the polishing disk 2 by virtue of the centrifugal force generated by rotation of the polishing disk 2 and is swept laterally off the glass sheet by the revolving baffle plates 6. As a result, the foul solution is prevented from remaining on the surface of the plate glass.

By the device of present invention, the foul solution can be removed immediately from the already polished surface of plate glass. Thus the foul solution can be prevented from sticking for any appreciable time to the surface of the plate glass in advance of and behind the polishing tool. Further, as the simple devices of the invention can be easily mounted on conventional polishing tools, it is possible to attain the above-mentioned objects, and this is one of the outstanding advantages of the present invention.

In the conventional method of polishing plate glass, both sides of the plate glass are first ground with the aid of abrasives, made of comparatively coarse grained silica sand or the like, until the both sides become parallel to each other, and then the ground surface is polished, usually with fine grained abrasives such as rouge and the like. However, such a method has a disadvantage that, despite the volume of glass removed in polishing being far less than that in grinding, the power required for polishing is equal to or greater than that required in grinding.

When a chemical polishing solution principally composed of hydrofluoric acid, fluorides, or bifluorides is used instead of rouge or the like, polishing is greatly facilitated, and such chemical polishing has an advantage over the conventional method in that polishing is done more economically with fewer polishing tools.

Figure 3:
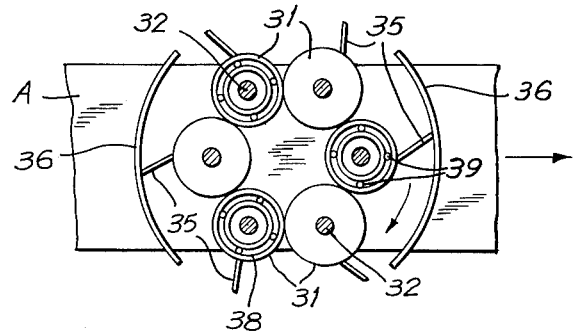
FIG. 3 is a plan view, partly in section, of another form of device embodying the invention.
Figure 4:
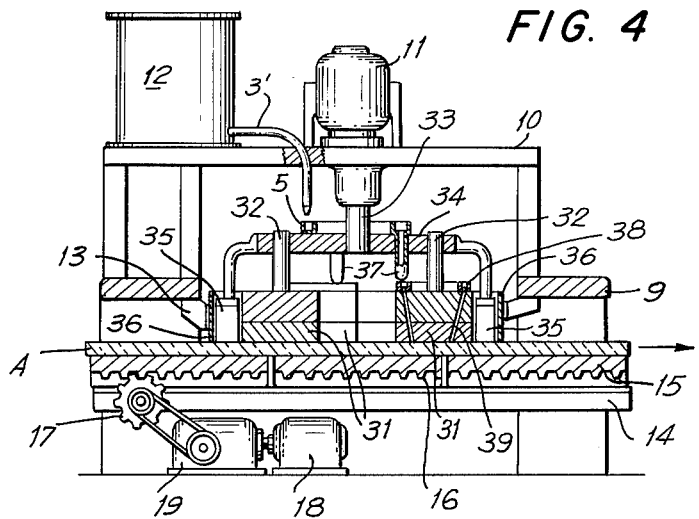
FIG. 4 is a side elevation view, partly in section, of the device shown in FIG. 3; and, FIG. 5 is a plan view, partly in section, of a modification of the device shown in FIGS. 3 and 4.
Figure 5:
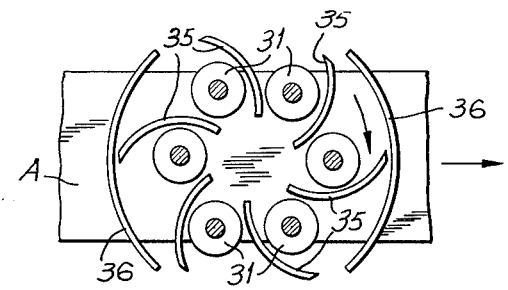

FIGS. 3 and 4 illustrate another embodiment of the invention wherein a selected number of circular polishing discs 31 are arranged around a circle. Polishing discs 31 constitute the polishing tools and each disc has a shaft 32 that is rotatably mounted in a circular plate 34 secured coaxially to the lower end of shaft 33. These discs 31 are provided with the baffle plates 35 mounted on extensions from plate 34. In this arrangement and as shown in FIG. 5, each of the baffle plates can be used in such a manner as to be interposed between the mutually adjacent polishing disks 31. Further, as shown in FIG. 1, outside the outer sheet 7 in the moving direction of plate glass A, as indicated by arrow B, a soft elastic sheet 20 may be set on the surface of plate glass A, while between outer sheet 7 and soft elastic sheet 20, water pipe spouts 21 may be so set that any remaining foul solution is perfectly removed from the surface of plate glass by washing with water.

In this case, the soft elastic sheet 20 and the pipe spouts 21 are supported on the frame 9.

The members in FIGS. 3 and 4 having the same references as those in FIGS. 1 and 2 respectively indicate that they have the same constructions as in FIGS. 1 and 2. The members 37 are a plurality of liquid supply pipes extending from the annular funnel 5. The lower open end of each liquid supply pipe 37 is located above a part of another annular trough or funnel 38 which is mounted in coaxial relation with the respective axle 32. Each annular funnel 38 is connected to liquid supply passages 39 which extend through the polishing disk 31. The polishing solution is, therefore, supplied to the liquid supply passage 39 from the tank 12 through the transport pipe 3', the annular funnel 5, the liquid supply pipe 37 and the annular funnel 38. The construction and operation of the embodiments of the invention shown in FIGS. 3, 4 and 5 are otherwise the same as those of the embodiment of the invention shown in FIGS. 1 and 2.

While preferred embodiments have been described above in detail, it will be understood that numerous modifications might be resorted to without departing from the spirit of the invention or the scope of the subjoined claims.

What we claim is:

1. A device for polishing plate glass using a reactive chemical solution such as hydrofluoric acid, fluorides, or bifluorides, said device comprising, in combination, at least one polishing disc having a circular periphery; an upright shaft; means for rotating said shaft; said disc being connected to said shaft for rotation thereby; means for supplying chemical solution through said disc to the surface of the plate glass contacted by the under surface of said disc and within the periphery of the disc; and generally vertically oriented flexible baffle plates supported by said shaft and extending generally radially outwardly from the periphery of said disc with lower substantially rectilinear edges in continuous contact with the surfaces of the glass, said baffle plates being revolved by said shaft through an annular path concentric with said disc to sweep used solution from the surface of the plate glass polished by said disc.

2. A device for polishing plate glass, as claimed in claim 1, including arcuately extending, generally upright, flexible baffles positioned concentric with said shaft and spaced radially from the periphery of said disc, and in contact with the radially outer edges of said baffle plates.

3. A device for polishing plate glass, as claimed in claim 1, comprising a plurality of said rotatable polishing discs positioned around a circle; means connecting said discs to said shaft for revolution about the axis of the latter; and means for supplying chemical solution through each of said discs to the surface of the plate glass contacted by the surface of the respective disc; said baffle plates extending outwardly from a circle surrounding and tangent to the circular peripheries of said discs.

4. A device for polishing plate glass, as claimed in claim 1, comprising a plurality of said rotatable polishing discs positioned around a circle; means connecting said discs to said shaft for revolution about the axis of the latter; and means for supplying chemical solution through each of said discs to the surface of the plate glass contacted by the surface of the respective disc; each of said baffle plates extending inwardly through the clearance between a respective pair of circumferentially adjacent discs, and outwardly beyond a circle which surrounds and is tangent to said circular discs.

References Cited by the Examiner

UNITED STATES PATENTS

| 1,177,673 | 5/1916 | Zurvalecz | 15—50 |
| 1,771,408 | 7/1930 | Hitchcock | 51—263 X |
| 3,019,564 | 2/1962 | Haracz | 51—110 X |

FOREIGN PATENTS 166,783  9/1953  Australia.

ALEXANDER WYMAN, *Primary Examiner.*

JACOB STEINBERG, *Examiner.*